Sept. 5, 1967 W. A. GANTZ 3,339,446
DEVICE AND METHOD FOR TUNING RESONATING INSTRUMENTS
Filed Jan. 25, 1965

INVENTOR.
WILLIAM A. GANTZ
BY
ATTORNEY

United States Patent Office 3,339,446
Patented Sept. 5, 1967

3,339,446
DEVICE AND METHOD FOR TUNING
RESONATING INSTRUMENTS
William A. Gantz, Berkeley, Calif., assignor to G.M.R., Inc., doing business as General Measurement Research, a corporation of California
Filed Jan. 25, 1965, Ser. No. 428,893
9 Claims. (Cl. 84—456)

The present invention relates to devices and methods for tuning resonating instruments and particularly to devices utilizing visual means for tuning.

The most generally used method to tune musical instruments to the same pitch is to strike a tuning fork or blow a pitch pipe and listen for a difference in frequencies. Visual aid devices for matching pitch have been devised in which a note is struck on an instrument and a reed, selected to correspond with the natural pitch of the instrument, is caused to vibrate by resonance. True pitch is attained when the reed appears to vibrate at maximum amplitude. The art of resonating reeds has been carried a step forward in instruments equipped with several reeds tuned to slightly different frequencies which are then visually compared for maximum amplitude. The reed vibrating at the greatest amplitude is assumed to be the one which is in sympathy with the driving force and therefore at pitch. Such devices are expensive and inherently inaccurate because of the difficulty in judging the maximum amplitude in a single reed instrument or the practical problem of providing enough reeds in a multiple reed instrument to correspond to every frequency and fraction of a frequency.

A more accurate means of tuning instruments is to cause two instruments to vibrate at or near the same frequency and amplitude and then to listen to the phenomenon known as "beating." "Beating" is defined as the fluctuations in amplitude, and the number of maxima (or minima) per second is the number of beats per second. The number of beats per second equals the difference of the frequencies. Beats between two tones can be detected by the ear as low as one half to one cycle per second and up to a beat frequency of six or seven per second. Although tuning by listening for the beat frequency is considerably more accurate than trying to merely match tones or watch for maximum amplitude on visual aid devices the phenomenon of listening for beats must be practised in fairly ideal quiet conditions and is therefore not suitable for tuning instruments in noisy auditoriums or other places where there is a high level of background noise. Indeed some people are unable to experience the phenomenon of beats. The present device enables a person to tune an instrument to one tenth of a cycle which is more accurate than tuning by the unaided human ear. Furthermore the method can be practised without even hearing the instrument.

Accordingly it is an object of the present invention to provide a device for visually tuning an instrument by utilizing the phenomenon of "beating."

Another object of the present invention is to provide a device of the character described which can be used to visually tune a resonating instrument to a given pitch with greater accuracy than the unaided ear can detect.

Still another object is to provide a device of the character above described which requires no modification of the instrument to be tuned; is lightweight and compact yet made of durable materials which will give long lasting trouble free service.

A further object of the present invention is to provide a method of visually tuning resonating instruments quickly and with great accuracy with little or no experience or skill.

A still further object of the present invention is to provide a device which not only visually indicates whether an instrument is on or off a given pitch but also indicates relatively how far off pitch.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

Referring to said drawing (one sheet):

The device of the present invention for tuning a resonating instrument such as a guitar 6 to a desired pitch consists briefly of a support 7, a reed 8 carried by the support and having a natural frequency of vibration of the given pitch; the support being adapted for connection to the instrument and being constructed to cause sympathetic vibration of the reed when the instrument is tuned to and near the pitch; and the reed having a shape confining its vibration to a single plane whereby the interchange of energy between the instrument and the reed when said instrument is vibrating near pitch will be made apparent at the reed in the form of a pair of rhythmically diverging and converging images 9 and 10.

The reed may be made of any flexible, elastic or springy material which will vibrate on excitation. The length of the reed is primarily determined by the frequency at which it is designed to vibrate sympathetically. For example a reed approximately three quarters of an inch (¾") in length and made from approximately four thousandths of an inch (.004") thick brass shim stock will vibrate sympathetically at a frequency of 82.4 cycles per second which corresponds to low E of a guitar. Merely shortening the length of the reed will cause it to vibrate sympathetically with vibrations of higher frequency.

One of the primary requisites of construction of the device in order to see "beats" is the necessity of causing the reed to vibrate in a single plane. The circular reeds of the prior art devices do not vibrate in a single plane but rather move in a somewhat circular pattern. In such devices "beat" could not be readily observed. I have found that constructing the reed from non-circular or flat material causes the reed to vibrate in one plane and beat is readily observable.

Another desirable feature is to construct the reed so that it will vibrate only when excited by an energy frequency very close to the resonant frequency of the reed. This may be obtained by selecting a reed of high "Q"; that is, the ratio of spring constant to damping factor. Thin brass shim stock has been found to have the desired characteristics although other materials may also be used.

Figure 3:
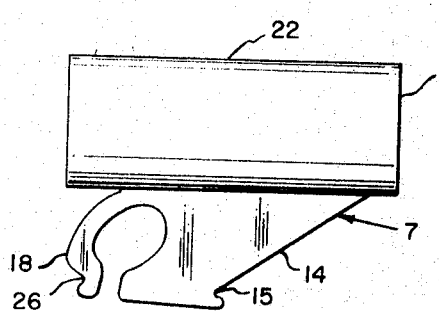
FIGURE 3 is a side view of the device shown on an enlarged scale.
Figure 4:
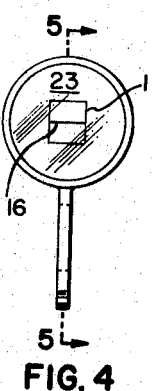
FIGURE 4 is an end view of the device.

"Beat" may be observed by viewing the reed at a point perpendicular to the plane of vibration or it may be more easily seen by observing the free end of the vibrating reed. A reed end which has a color contrasting background may be easily observed or a target 11 may be mounted on the reed. The target may be a separate element or may consist merely of bending the free end of the reed. "Beat" may be observed even though the target is a solid color but observation is greatly enhanced by marking the target with an indicia mark such as a single line 16 as shown in FIGURE 4.

Figure 5:
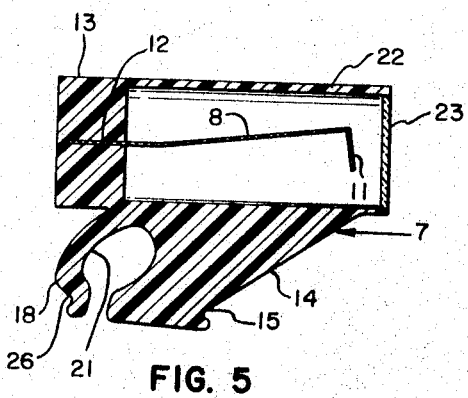
FIGURE 5 is a cross section of the device shown in FIGURE 4 taken generally along the line 5—5.
Figure 2:
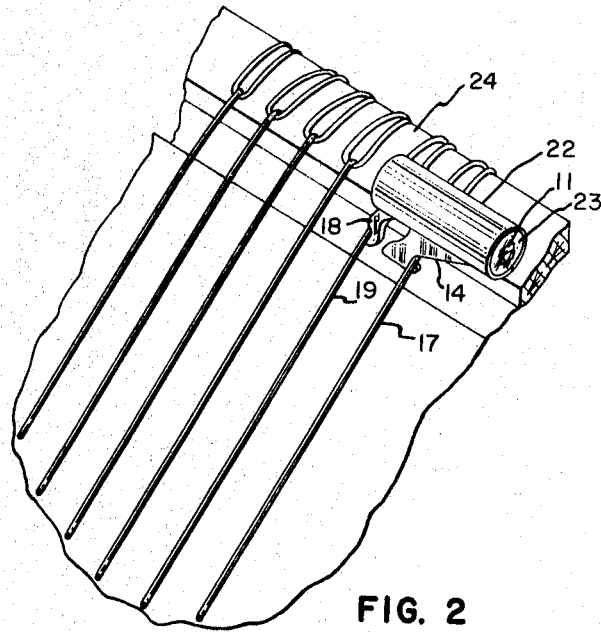
FIGURE 2 is a perspective view of the device on an enlarged scale attached to a pair of strings adjacent a bridge of a musical instrument.
Figure 1:
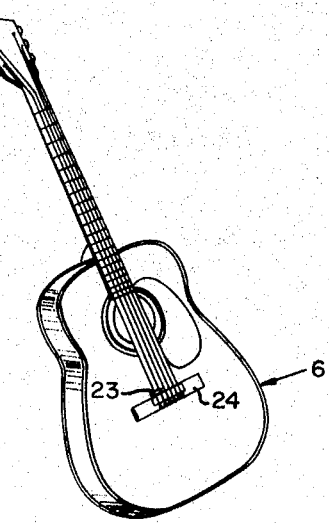
FIGURE 1 is a perspective view of the device shown in use on a guitar.

As previously mentioned, the reed support must be constructed so as to couple the reed to the instrument to be tuned so that the reed will vibrate sympathetically and yet be decoupled sufficiently so that the amplitude of the driving instrument will be decreased and there is an exchange of energy between the reed and the instrument. The support may be constructed of plastic, metal, wood or rubber or any combination. As shown in FIGURE 5, the end of the reed 12 is encased in a thickened portion 13. The support not only serves to support the end of the reed but also to connect the device to the instrument to be tuned. The support may be of various shapes depending on the connection desired. The reed may be actually supported and connected to a smooth surface of a guitar or other instrument by a rubber suction cup but rubber is a material which dampens vibration and creates a very poor connection for the exchange of energy between the reed and the instrument. A far superior connection may be obtained by coupling the device directly to a string as shown in FIGURES 1 and 2. The support is here shown with a rigid leg 14 having a notch portion 15 for connection with a string 17. The device may be conveniently supported by forming the support to create a spring leg 18 opposite the rigid leg having a notch or recess 26 so as to embrace an adjacent string 19. Spring leg 18 may be constructed of a separate piece of spring wire or as shown in FIGURE 5 it is merely created by punching an opening 21 in a thin sheet of material such as plastic, wood, rubber or metal.

Still another function served by the support is to protect the thin read. A simple yet attractive and functional structure is to shape the wall 22 in the shape of a cylinder forming a chamber in which the reed may freely vibrate. The wall may be translucent or opaque but it is generally desirable to make the wall opaque with an end wall 23 transparent so as to direct attention to the target.

Where the device is mounted on a stringed instrument it is preferably mounted adjacent the bridge 24. The device is here mounted by nesting string 19 in notch 26 provided in spring leg 18; forcing the spring leg lightly towards rigid leg 14 and slipping notch 15 into nesting engagement with string 17. In this position a target may be viewed through the transparent wall by holding the instrument, such as a guitar, in the normal position for tuning. A material capable of performing all of the above functions required in the support as listed above is a clear cellulose acetate butyrate. Wall 23 may be left clear while the remainder of the support may be either painted or left clear.

Figure 6:
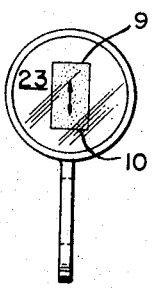
FIGURE 6 is an end view of the device illustrating the images produced by the device when an instrument is at the pitch of the device.
Figure 7:
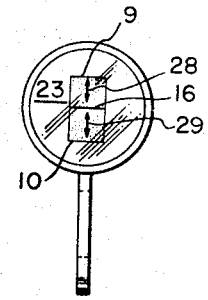
FIGURE 7 is an end view of the device illustrating schematically the image produced by the device when the instrument to be tuned is out of pitch.

The method of the present invention of tuning a resonating instrument to a desired pitch consists briefly of coupling a reed having a natural frequency of vibration of the pitch of the instrument so as to provide an interchange of energy between the instrument and reed, the reed being confined so as to vibrate in a single plane; causing the instrument to emit a vibration near the given pitch; observing the reed, which appears to the eye to separate into two distinct images which repeatedly diverge and converge in a rhythmic pattern as indicated in FIGURE 7 by doubleheaded arrows; and varying the frequency of the instrument and simultaneously observing the reed until the two distinct images remain diverged for a period of time as shown in FIGURE 6, converging slowly as the vibration intensity of the instrument decreases to a rest position shown in FIGURE 4.

In viewing the device as shown in FIGURE 4, in which a straight black horizontal is superimposed upon a white background target, the whole white rectangle expands into a rectangle when the reed is vibrated. The eye is attracted to the thin black line which becomes a blur and gradually washes out into a pair of separated grey bands across the white rectangle. As the device "beats" the black line becomes a dull gray as it diverges and merges into a narrow black line when the images appear to converge. It is the rhythmic diverging and converging which is very noticeable when the instrument is out of pitch. Another method of observing the "beat" is to watch the expansion and contraction of the white background as it moves from a square to a rectangle in a rhythmic pattern. When the instrument is on pitch, the line images 9 and 10 appear to stay in a diverged position for a period of time and only slowly converge as the vibration intensity decreases, but do not diverge until the string is plucked again or the instrument energized to increase the intensity of vibration. Once a single string of a musical instrument is in perfect tune the remaining strings may be tuned by the usual step-by-step fret method.

I claim:

1. A device for tuning a resonating instrument to a desired pitch comprising:

a support;

a single reed carrier by said support and having a natural frequency of vibration of said pitch;

said support being adapted for connection to said instrument and being constructed to permit interchange of energy between said resonating instrument and said reed when said instrument is tuned to and near said pitch; and said reed having a shape confining its vibration to a single plane whereby the interchange of energy between said instrument and said reed when said instrument is vibrating near pitch will be made apparent at said reed in the form of a pair of rhythmically diverging and converging images.

2. A device for tuning a resonating instrument to a desired pitch comprising:

a support;

a single reed carried by said support and having a natural frequency of vibration of said pitch;

a target mounted on said reed;

said support being adapted for connection to said instrument and being constructed to permit interchange of energy between said resonating instrument and said reed when said instrument is tuned to and near said pitch; and said reed having a non-circular shape confining its vibration to a single plane whereby the interchange of energy between said instrument and said reed when said instrument is vibrating near pitch will be made apparent at said target in the form of a pair of rhythmically diverging and converging target images, and by diverging images when said target is vibrating at pitch.

3. A device for tuning a string of a resonating stringed instrument to a given pitch comprising:

a support having a notched leg adapted for connection to a string of said instrument and a spring leg adapted for connection to an adjacent string;

a single reed carried by said support and having a natural frequency of said string at pitch and having a shape confining said vibration to a single plane;

said support being constructed and connected so as to exchange energy between said reed and string; and said reed vibrating upon vibration of said string so as to appear to separate into two distinct images which rhythmically diverge and converge when said string is out of tune and remain diverged for a sustained period when said string is in tune.

4. A device for tuning a resonating instrument to a desired pitch comprising:
- a support having a wall forming an enclosed chamber a portion of said wall being transparent;
- a single reed having a natural frequency of said instrument at pitch and being mounted within said chamber and having a non-circular shape so as to vibrate in one plane only;
- a target carried by said reed adjacent said transparent portion for viewing; and
- said support being adapted for connection and being constructed so as to exchange energy between said reed and instrument so that upon vibration of said instrument and vibration of said reed said target appears to separate into two distinct images which rhythmically diverge and converge when said instrument is out of tune and remain diverged for a sustained period when said instrument is in tune.

5. A device for tuning a resonating instrument to a desired pitch comprising:
- a support;
- a single reed having a natural frequency of vibration at said pitch and having a non-circular shape so as to vibrate in one plane only;
- a target carried by said reed providing a reference mark and a color contrasting background;
- said support being adapted for connection to said instrument and being constructed so as to exchange energy between said reed and instrument so that upon vibration of said instrument and vibration of said reed said mark appears to separate into two distinct images which rhythmically diverge and converge when said instrument is out of tune and remain diverged for a sustained period when said instrument is in tune.

6. A device for tuning a string of a resonating stringed instrument to a desired pitch comprising:
- a support having a notched rigid leg adapted for engagement with said string to be tuned and a spring leg adapted for engagement with an adjacent string and a wall forming a closed opaque chamber except for one end to direct the view of the tuner;
- a single reed carried by said support and having a natural frequency of vibration of said string at pitch;
- a target carried by said reed adjacent said chamber end;
- said support being adapted for connection to said string so that said target is visible in the normal instrument tuning position and being constructed to permit interchange of energy between said resonating instrument and said reed when said string is tuned to and near said pitch; and
- said reed having a shape confining its vibration to a single plane whereby the interchange of energy between said string and said reed when said string is vibrating near pitch will be made apparent at said reed in the form of a pair of rhythmically diverging and converging images, and by diverged images when said string is in tune.

7. A method of tuning a resonating instrument to a desired pitch which comprises:
- coupling a reed having a natural frequency of vibration of said pitch to said instrument to provide an interchange of energy between said instrument and reed, said reed being confined so as to vibrate in a single plane;
- causing said instrument to emit a vibration near said pitch, and thereby causing said reed to vibrate at its natural frequency;
- observing said reed which appears to the eye to separate into two distinct images which repeatedly diverge and converge in a rhythmic pattern; and
- varying the frequency of said instrument and simultaneously observing said reed until said two distinct images remain diverged for a period of time, converging slowly as the vibration intensity of said instrument decreases.

8. A method of tuning a string of a resonating stringed instrument to a desired pitch which comprises:
- coupling a reed having a natural frequency of vibration of said pitch to said string adjacent the bridge of said instrument to provide an interchange of energy between said string and reed, said reed being confined so as to vibrate in a single plane and having a visual target attached thereto;
- causing said string to emit a vibration near said pitch, and thereby causing said reed to vibrate at its natural frequency;
- observing said target which appears to the eye to separate into two distinct images which repeatedly diverge and converge in a rhythmic pattern; and
- varying the frequency of said string and simultaneously observing said target until said two distinct images remain diverged for a period of time, converging slowly as the vibration intensity of said string decreases.

9. A device for tuning a resonating instrument to a desired pitch comprising:
- a support;
- a single reed carried by said support and having a natural frequency of vibration of said pitch;
- coupling means carried by said support adapted for elastically coupling said device to said instrument and permitting an energy exchange between said instrument and said reed; and
- said reed having a shape confining its vibration to a single plane whereby the interchange of energy between said instrument and said reed when said instrument is vibrating near pitch will be made apparent at said reed in the form of a pair of rhythmically diverging and converging images.

References Cited

UNITED STATES PATENTS

| | | | |
|---|---|---|---|
| 796,289 | 8/1905 | Brady | 84—454 |
| 834,416 | 10/1906 | Shutt | 84—454 |
| 841,384 | 1/1907 | England | 84—454 |
| 2,228,249 | 1/1941 | Alyn | 84—454 |
| 2,295,902 | 9/1942 | Kass | 84—455 |
| 2,514,315 | 7/1950 | Dickerson | 84—454 |
| 2,543,573 | 2/1951 | Gifford | 84—456 X |
| 2,779,920 | 1/1957 | Petroff | 84—454 X |
| 3,058,384 | 10/1962 | Musser | 84—454 |

FOREIGN PATENTS

| | | |
|---|---|---|
| 205,560 | 1/1909 | Germany. |

RICHARD B. WILKINSON, *Primary Examiner.*

LEO SMILOW, *Examiner.*

C. M. OVERBEY, *Assistant Examiner.*